June 23, 1964 D. R. KNOWLTON 3,138,197
WEBBING CLIP APPLICATION
Filed April 27, 1962 2 Sheets-Sheet 1
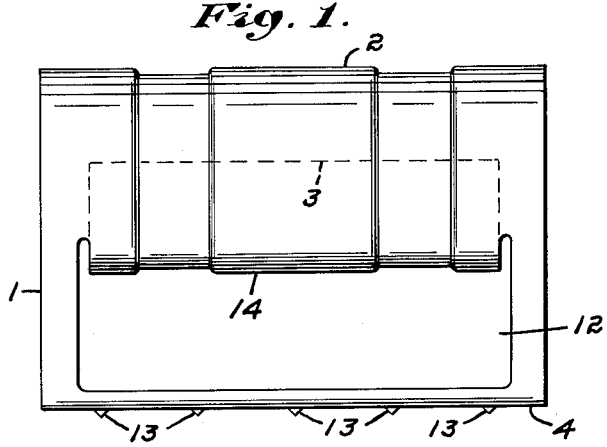
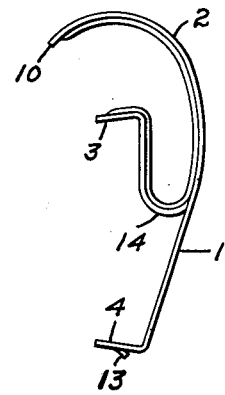
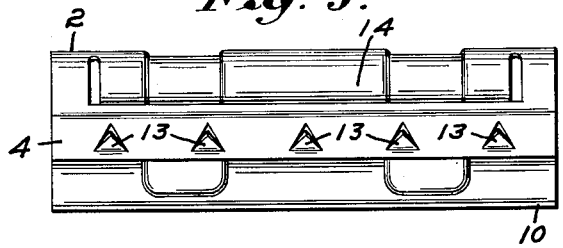
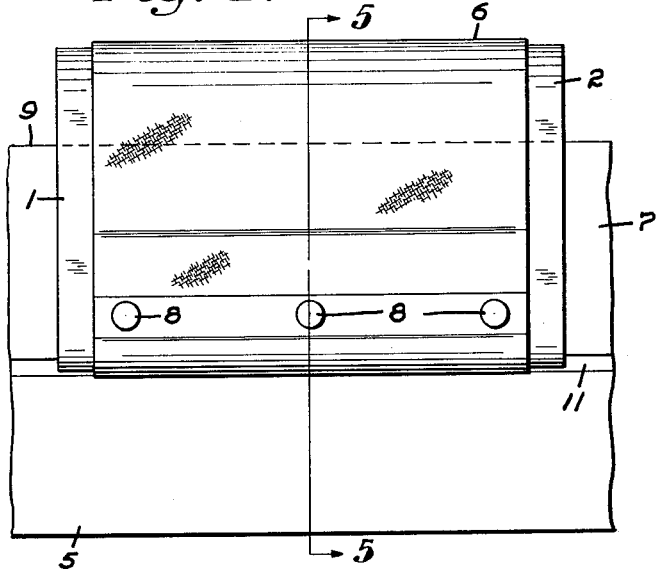
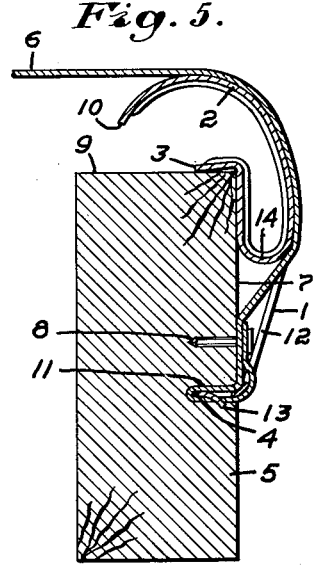
Inventor:
David R. Knowlton,
by Walter P. Jones
Atty.

June 23, 1964  D. R. KNOWLTON  3,138,197
WEBBING CLIP APPLICATION
Filed April 27, 1962  2 Sheets-Sheet 2
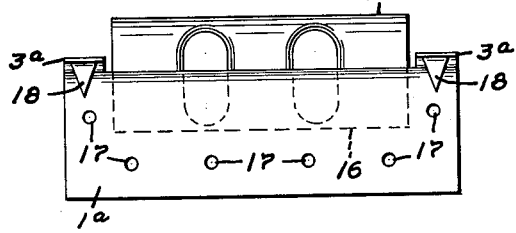
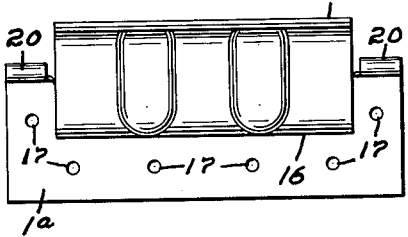
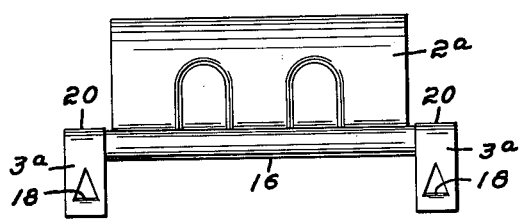
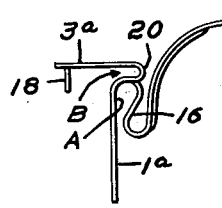
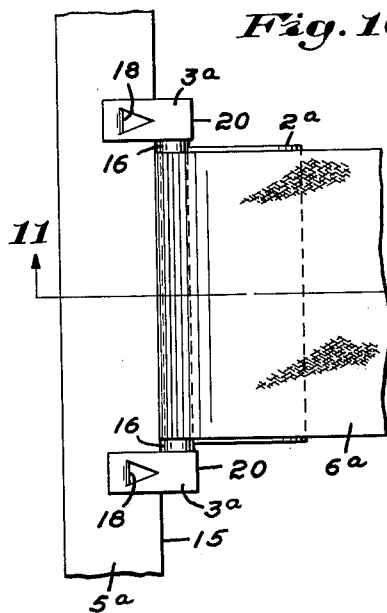
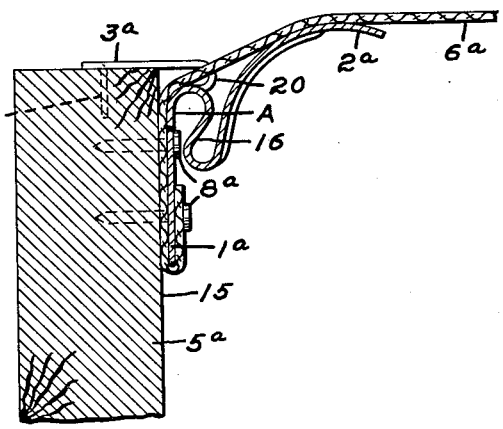
Inventor:
David R. Knowlton,
by Walter S. Jones
Atty.

United States Patent Office 3,138,197
Patented June 23, 1964

3,138,197
WEBBING CLIP APPLICATION
David R. Knowlton, Ipswich, Mass., assignor to United-Carr Incorporated, a corporation of Delaware
Filed Apr. 27, 1962, Ser. No. 192,622
1 Claim. (Cl. 160—383)

This invention aims to provide improvements in webbing clip applications such as might be used in the manufacture of furniture as, for instance, in the construction of an upholstery chair seat spring means for supporting a cushion.

An object of the invention is to provide a construction which includes a frame member, preferably of wood, webbing strips crossing the opening of the frame, and newly designed clips attached to the frame and supporting and holding the webbing strips in a spring-like arrangement.

A further object of the invention is to provide clips that will maintain the tension upon the strips and not take a "set" while having the ability of "taking up" a normal amount of stretch that may occur in the webbing strips.

In the drawings which illustrate preferred embodiments of the invention:

FIG. 1 is a front elevational view of a preferred form of clip;

FIG. 2 is an edge view of the clip shown in FIG. 1;

FIG. 3 is a bottom view of the clip shown in FIG. 1;

FIG. 4 is a partial elevational view of a seat frame showing the installation of a clip and a webbing strip;

FIG. 5 is a section taken on the line 5—5 of FIG. 4;

FIG. 6 is an elevational view of a modified form of clip from the rear side of the clip;

FIG. 7 is a front elevational view of the clip shown in FIG. 6;

FIG. 8 is a plan view of the clip shown in FIG. 6;

FIG. 9 is an edge view of the clip shown in FIG. 6;

FIG. 10 is a partial plan view of a seat or other frame construction showing a modified form of clip attached to the frame and holding a webbing strip in place; and FIG. 11 is a section taken on the line 11—11 of FIG. 10.

Referring now to the embodiment of the invention illustrated by FIGS. 1 through 5, there is shown a preferred form of clip preferably made from a single piece of spring metal. The clip has a body portion 1 provided with a full width spring finger 2, a support engaging portion 3 formed of material taken from the body portion 1, and a flange portion 4 also for engaging the frame of the construction.

The application of the clips may provide a combination of a wooden support 5 (FIGS. 4 and 5), a plurality of webbing strips 6 held in place by the clips and a seat cushion (not shown). The wooden support 5 may be the seat supporting frame of a chair or the like of any suitable shape as will be understood by those skilled in the furniture art.

Each clip (FIGS. 4 and 5) is attached to the outside wall 7 of the support 5, and the support engaging portion 3 rests upon the upper edge 9 of the frame 5. When thus mounted each clip has its spring finger 2 overlying the edge 9 of the support 5 (FIG. 5) in spaced relation and the spring finger has a suitable portion 10 provided by a downwardly turned end. Furthermore, the flange portion 4, of the clip, extends into a groove 11 in the support 5. An end portion of a webbing strip 6 passes over the spring finger 2, through a slot 12 (formed by taking out the material for the support engaging portion 3) then under the body portion 1 where it is wrapped around the flange portion 4 (FIG. 5) and is finally doubled back upon itself and held in place by the nail or nails 8 driven into the support 5. It will be noted that the flange portion 4 has sharp prongs 13 that pierce the webbing strip 6 and which is held firmly in the groove 11 and catches into the support 5, as best shown in FIG. 5.

While there has been shown and described a frame structure of wood or the like, it should be understood that the frame may be made of metal or other suitable material and the flange portion 4 may pass through a slot and also the nails may be replaced by screws and the webbing strips may be threaded to the clip in a reverse manner from the disclosure so that in that case the end portions of the webbing strips would be concealed.

In order to provide more spring life to the clips each has a loop portion 14 connecting the spring finger 2 to the support engaging portion thus spacing the spring finger 2 from the support 5 and providing a greater resiliency to the spring finger 2.

When a frame is completely installed with suitable webbing strips 6 by the use of clips as described above and then weight is applied, either directly to the webbing or through a supported cushion, the spring fingers 2 yield and the loop portions 14 also yield. If the weight applied is relatively heavy, then the ends or stop portions 10 of the fingers 2 contact the frame 5 and prevent the spring fingers from taking permanent "sets."

Referring now to the modification of the invention shown in FIGS. 6 through 11, the installation includes a frame 5a, webbing strip 6a and clips mounted to the inner wall 15 of the frame 5a. By mounting the clips on the inner wall 15 of the frame 5a a different problem arises, thereby requiring clips of different construction than those described in connection with FIGS. 1 through 5. The clips shown in FIGS. 6 through 11 each have a body portion 1a, a spring finger 2a, a support engaging finger 3a and a loop portion 16 (in this case a sort of double loop) connecting the spring finger 2a to the body portion 1a. The clip illustrated is attached by nails 8a passing through holes 17 in the body portion 1a and also has prongs 18—18 extending into the support 5a from the support engaging portion 3a, as best shown in FIGS. 10 and 11. If it is desired to make a stronger attachment, the openings made by the prongs 18—18 may be used as nail or screw holes.

In the modified assembly the webbing strips 6a pass over the spring fingers 2a and then between the support 5a and the body 1a. Their ends are folded over and held in place by some of the nails 8a, as shown in FIG. 11.

The modified clips are provided with loop portions 20 connected by the body portion 1a and the portion forming the support engaging portion 3a. These looped portions 20 are important in that they change the line of force exerted by the spring finger 2a upon the body portion 1a from a tearing action at A (FIG. 11) to a line at right angles to the plane of the body portion 1a as shown by the arrow B in FIG. 9. Thus the loop 20 prevents tearing of the middle of the body portion 1a which tearing action was found to occur when loops were not used.

When weight is applied to the webbing strips 6a of the modified assembly the spring fingers 2a are compressed and the double loops 16 will add resiliency to the fingers and will bear against the body portions 1a to act as stops thereby preventing "setting" of the spring fingers. Also the loop portions 20 will act to add flexibility thereby providing longer life to the clips especially when above normal pressures are exerted upon the spring fingers 2a.

While there has been illustrated and described two forms of applications showing the invention presented by this application, it should be understood that the invention is best defined by the following claim.

I claim:
A webbing clip application comprising in combination a frame of a seat or the like, webbing strips for said frame and a plurality of one-piece clips securing said webbing strips to said frame, each of said clips being attached to said frame, each clip having a spring finger portion supporting a webbing strip in spring tensioned relation to said frame and each clip having a loop portion opening towards said spring finger having a portion positioned between said spring finger and said frame, said spring finger flexing, in part, about said loop portion and said loop portion co-operating and engaging with said frame and said spring finger having a free terminal end providing a stop and a portion of the clip depending below said loop portion and attached to said frame.

References Cited in the file of this patent

UNITED STATES PATENTS

| | | |
|---|---|---|
| 2,233,986 | Leech | Mar. 4, 1941 |
| 2,586,262 | Robins | Feb. 19, 1952 |
| 2,871,926 | Haschke | Feb. 3, 1959 |
| 2,899,693 | Stollenwerk | Aug. 18, 1959 |

FOREIGN PATENTS

| | | |
|---|---|---|
| 692,488 | Great Britain | Aug. 4, 1930 |